United States Patent
Erber et al.

(10) Patent No.: US 12,503,171 B2
(45) Date of Patent: Dec. 23, 2025

(54) COMBINED FLOOR ASSEMBLY AND ENERGY STORAGE DEVICE, FOR AN ELECTRICALLY DRIVEN PASSENGER CAR

(71) Applicant: Bayerische Motoren Werke Aktiengesellschaft, Munich (DE)

(72) Inventors: Florian Erber, Munich (DE); Ronny Grosse, Eichenau (DE); Piotr Kotlarski, Munich (DE); Martin Spaeth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 363 days.

(21) Appl. No.: 18/035,179

(22) PCT Filed: Oct. 26, 2021

(86) PCT No.: PCT/EP2021/079602
§ 371 (c)(1),
(2) Date: May 3, 2023

(87) PCT Pub. No.: WO2022/100997
PCT Pub. Date: May 19, 2022

(65) Prior Publication Data
US 2023/0406415 A1    Dec. 21, 2023

(30) Foreign Application Priority Data
Nov. 11, 2020  (DE) .................... 10 2020 129 748.3

(51) Int. Cl.
*B62D 25/20* (2006.01)
*B60K 1/04* (2019.01)

(52) U.S. Cl.
CPC ................ *B62D 25/20* (2013.01); *B60K 1/04* (2013.01); *B62D 25/2027* (2013.01); *B60K 2001/0438* (2013.01)

(58) Field of Classification Search
CPC ................ B62K 25/20; B62K 25/2036; B62K 25/2027; B60K 1/04; B60K 2001/0438; B60K 2001/0416; Y02T 10/70
(Continued)

(56) References Cited

U.S. PATENT DOCUMENTS 9,937,781 B1    4/2018  Bryer et al.
10,589,790 B2 *  3/2020  Ayukawa ............. B62D 21/152
(Continued)

FOREIGN PATENT DOCUMENTS

DE    10 2009 042 513 A1    3/2011
DE    10 2013 210 576 A1    12/2014
(Continued)

OTHER PUBLICATIONS

International Search Report (PCT/ISA/210) issued in PCT Application No. PCT/EP2021/079602 dated Jan. 28, 2022 with English translation (four (4) pages).
(Continued)

*Primary Examiner* — Roger L Pang
(74) *Attorney, Agent, or Firm* — Crowell & Moring LLP

(57) ABSTRACT

A combined floor assembly and energy storage device for an electrically driven passenger car includes a floor assembly on the lower face of which an energy storage device of an electric drive of the passenger car is arranged. A holding element, by which a rear end region of the energy storage device is held on the lower face of the floor assembly, and a rear cross-member, which is arranged on the lower face of the floor assembly and behind the energy storage device in the vehicle longitudinal direction are provided. In order to provide a combined floor assembly and energy storage device which offers especially rigid support for the rear cross-member even in a vehicle with a purely electric drive and in which, additionally, the energy storage device is fixed
(Continued)

to the rear end on the lower face of the floor assembly in a particularly stable manner, the energy storage device is secured to the rear cross-member by way of the holding element.

3 Claims, 9 Drawing Sheets

(58) Field of Classification Search
USPC .................................. 296/193.07; 180/68.5
See application file for complete search history.

(56) References Cited

U.S. PATENT DOCUMENTS

| | | | |
|---|---|---|---|
| 12,319,145 B2* | 6/2025 | Grosse | B60K 1/04 |
| 2011/0068606 A1 | 3/2011 | Klimek et al. | |
| 2013/0126255 A1* | 5/2013 | Saeki | H01M 50/249 |
| | | | 180/68.5 |
| 2016/0083012 A1 | 3/2016 | Stenzenberger et al. | |
| 2017/0210218 A1 | 7/2017 | Schmalzrieth et al. | |
| 2019/0061830 A1* | 2/2019 | Fujisawa | B62D 25/08 |
| 2022/0196808 A1 | 6/2022 | Nguyen et al. | |
| 2023/0373289 A1* | 11/2023 | Grosse | B62D 25/2027 |

FOREIGN PATENT DOCUMENTS

| | | |
|---|---|---|
| DE | 10 2016 000 669 B3 | 1/2017 |
| DE | 10 2017 130 399 A1 | 6/2018 |
| DE | 10 2018 214 109 A1 | 2/2020 |
| DE | 10 2019 106 266 A1 | 9/2020 |

OTHER PUBLICATIONS

German-language Written Opinion (PCT/ISA/237) issued in PCT Application No. PCT/EP2021/079602 dated Jan. 28, 2022 (five (5) pages).

German-language Office Action issued in German Application No. 10 2020 129 748.3 dated Oct. 25, 2021 (four (4) pages).

English translation of Chinese-language Office Action issued in Chinese Application No. 202180075772.X dated July 31, 2025 (6 pages).

\* cited by examiner

COMBINED FLOOR ASSEMBLY AND ENERGY STORAGE DEVICE, FOR AN ELECTRICALLY DRIVEN PASSENGER CAR

BACKGROUND AND SUMMARY

The invention relates to a combined floor assembly and energy store for an electrically drivable passenger car.

A combined floor assembly and energy store of this type, known from DE 10 2018 214 109 A1, for an electrically drivable passenger car comprises a floor assembly, on the underside of which an energy store of an electric drive of the passenger car is arranged. In addition, in the case of one design variant with a short energy store, a holding element in the form of a plate-like additional reinforcing element is provided, by means of which a rear end region of the energy store is held on the underside of the floor assembly on a rear crossmember which for its part is arranged at a spacing in the vehicle longitudinal direction in front of a rear axle mount which is likewise fastened to the underside of the floor assembly.

In the case of many passenger cars which will be marketed in the future, it is envisaged that the customers will be offered different drive concepts within a vehicle range. Thus, in particular electric vehicles (xEV) are also intended to be marketed alongside vehicles with a purely internal combustion engine drive (ICE). These electric vehicles (xEV) are differentiated, for example, into pure electric vehicles (BEV) and hybrid vehicles (PHEV) in which an internal combustion engine is also provided in addition to the electric drive.

In order to keep the costs low and to construct the additional electric drive variants (xEV) on the same production lines, existing components and structures have to be retained as far as possible. These also include the chassis with the corresponding axle mounts. In the case of vehicles with a purely internal combustion engine drive (ICE), these axle mounts are usually connected by what are known as torsion struts to the rear ends of the side sills for rigidity requirements.

In order, moreover, to provide sufficient electric range, a flat store has to be integrated below the body/floor assembly and between the two axles in the case of vehicles with a purely electric drive (BEV).

The store installation space in front of the rear axle, however, prevents the retention of the torsion struts which cannot be dispensed with, however, from a functional aspect.

It is therefore an object of the present invention to provide a combined floor assembly and energy store, in the case of which the rear axle mount is supported in a particularly rigid manner even in the case of a vehicle with a purely electric drive (BEV) and, in addition, the energy store is fixed at the rear end in a particularly stable manner on the underside of the floor assembly.

According to the invention, this object is achieved by way of a combined floor assembly and energy store with the features of the independent claim. Favorable refinements of the invention are the subject matter of the dependent claims.

The combined floor assembly and energy store according to the invention comprises a floor assembly, on the underside of which an energy store of an electric drive of the passenger car is arranged in front of a rear axle mount positioned behind it in the vehicle longitudinal direction.

In order to provide a combined floor assembly and energy store here, in the case of which the rear axle mount is supported in a particularly rigid manner even in the case of a vehicle with a purely electric drive (BEV) and, in addition, the energy store is fixed at the rear end in a particularly stable manner on the underside of the floor assembly, a holding element, in particular in the form of a cross member which will be explained in greater detail in the further text, is provided according to the invention, by means of which a rear end region of the energy store is fastened to the rear axle mount via the holding element.

It is therefore firstly possible by means of the holding element/cross member to fix the energy store in the rear end region in an improved manner to the floor assembly or to the body in white, to be precise in the region of the vehicle center. Moreover, the holding element/cross member serves for improved support of the rear axle mount, in particular in order to absorb static and dynamic longitudinal and lateral forces. Here, the load path runs, for example, as follows: from the respective rear wheel, the forces are transferred via the respective link to the rear axle mount, and from there via the holding element/cross member into the energy store, and are finally introduced into the floor assembly/vehicle body.

It is a further advantage of the combined floor assembly and energy store according to the invention that the holding element/cross member additionally serves as a bollard, bumper and underbody guard for the rear end region of the energy store.

In the case of the explained design variant of the combined floor assembly and energy store for a purely electric drive (BEV)-started energy store, the problem usually additionally arises that the energy store/high voltage store is already fastened to the underside of the floor assembly during assembly before what is known as the marriage of the floor assembly to the drive and chassis of the motor vehicle takes place. In this temporal interstice, it should be avoided, in particular, that the energy store hangs freely with its rear end without direct fastening to the floor assembly, which can possibly lead to a type of deflection and thus to damage to the energy store. Accordingly, fastening of the energy store to the body far behind its center of gravity should be achieved precisely for a combined floor assembly and energy store which is used in the case of a purely electric drive (BEV), in order that, in the case of a separate store assembly operation, the energy store/high voltage store does not hang freely until the marriage. This is achieved by means of the described holding element/cross member.

In one advantageous refinement of the invention, the holding element is fastened by way of respective lateral ends to fastening points of the energy store, the energy store being fastened in the region of the fastening points to respective lateral holders on the floor assembly. The lateral ends are thus preferably connected to the respective lateral holders of the floor assembly via the energy store. To this end, the fastening points of the energy store with the holding element/cross member are preferably situated so as to overlap with the body-side holders of the floor assembly in the vehicle vertical direction. These measures according to the invention firstly achieve favorable securing of the holding element/cross member overall and secondly make it possible for the energy store and the rear axle mount to be mounted and dismantled separately to/from one another.

A further advantageous refinement of the invention provides that the holding element is configured as a substantially U-shaped cross member which engages around the end region of the energy store. This makes it possible, for example, that the cross member can be fixed on the vehicle body side in the transition region between the side sills and the rear longitudinal beams, and the rear end region can nevertheless reach as far as the rear axle mount and is fixed particularly favorably here by means of the cross member.

In a further advantageous refinement of the invention, the holding element or the cross member has a shear area/support part which is of softer configuration for tolerance compensation in the vehicle vertical direction than a carrier part of the holding element, to which the shear area/support part is fastened. By means of the shear area/support part, the rear end region of the energy store can therefore be fixed in a simple way to the carrier part in a particularly simple and stable manner. In addition, the shear area/support part then acts as an underbody guard for the rear end region of the energy store.

In the case of a further advantageous embodiment of the invention, the holding element is assembled from a plurality of shell elements. As a result, the holding element can be configured, for example, in a particularly simple and stable manner in a sheet metal shell design as a closed box-type profile. As an alternative, however, it would also be conceivable for the holding element to be produced, for example, from extruded profiles, flat steel parts or the like.

In addition, it has been shown to be advantageous if the shear area/support part is configured as an integral part of one of the shell elements which is connected in the region of the carrier part to a further shell element with the configuration of a hollow carrier structure. This results in a particularly simple design of the holding element/cross member.

In a further refinement of the invention, respective support elements for fastening the holding element are arranged on the rear axle mount. This results in a particularly favorable connection between the rear axle mount and the holding element/cross member. As an alternative to this, the attachment can also take place directly to the rear axle mount.

In a further refinement of the invention, the fastening points for the holding element to the holders and fastening points for the holding element to the rear axle mount serve in a second design variant of the combined floor assembly and energy store for a passenger car with a hybrid drive (PHEV) to fasten respective struts to the holders and to the rear axle mount, respectively. Therefore, merely a small amount of adaptation work is necessary between the two design variants.

Further features of the invention become apparent from the claims, the figures, and the description of the figures. The features and combinations of features mentioned above in the description, and the features and combinations of features mentioned below in the description of the figures and/or shown solely in the figures can be used not only in the respective stated combination but also in other combinations or individually.

The invention will now be explained in greater detail on the basis of preferred exemplary embodiments and with reference to the drawings.

BRIEF DESCRIPTION OF THE DRAWINGS

FIGS. 5a, b show details of a perspective sectional view and a lateral sectional view along a sectional plane which runs in the vehicle vertical direction and is indicated by the line Vs-Vs in FIG. 2a, and FIG. 5c shows a lateral sectional view along a sectional plane which runs in the vehicle vertical direction and is indicated by the line Vg-Vg in FIG. 2a.

DETAILED DESCRIPTION OF THE DRAWINGS

Figure 1A:
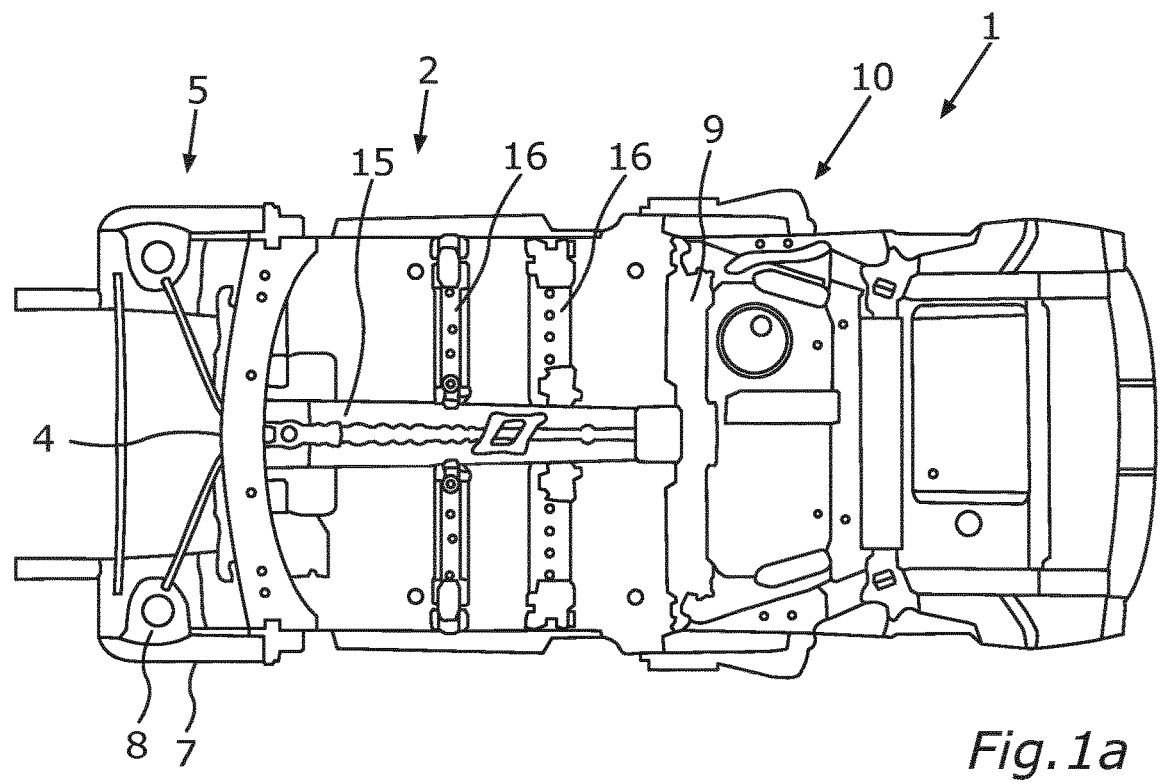
FIGS. 1a, b show a plan view and a view from below, respectively, of a floor assembly, which is applicable across all design variants, for an electrically drivable passenger car, which is provided in one design variant of the combined floor assembly and energy store for a vehicle exclusively with an electric drive (BEV) and in a further design variant of the combined floor assembly and energy store for a vehicle with a hybrid drive (PHEV).
Figure 1B:
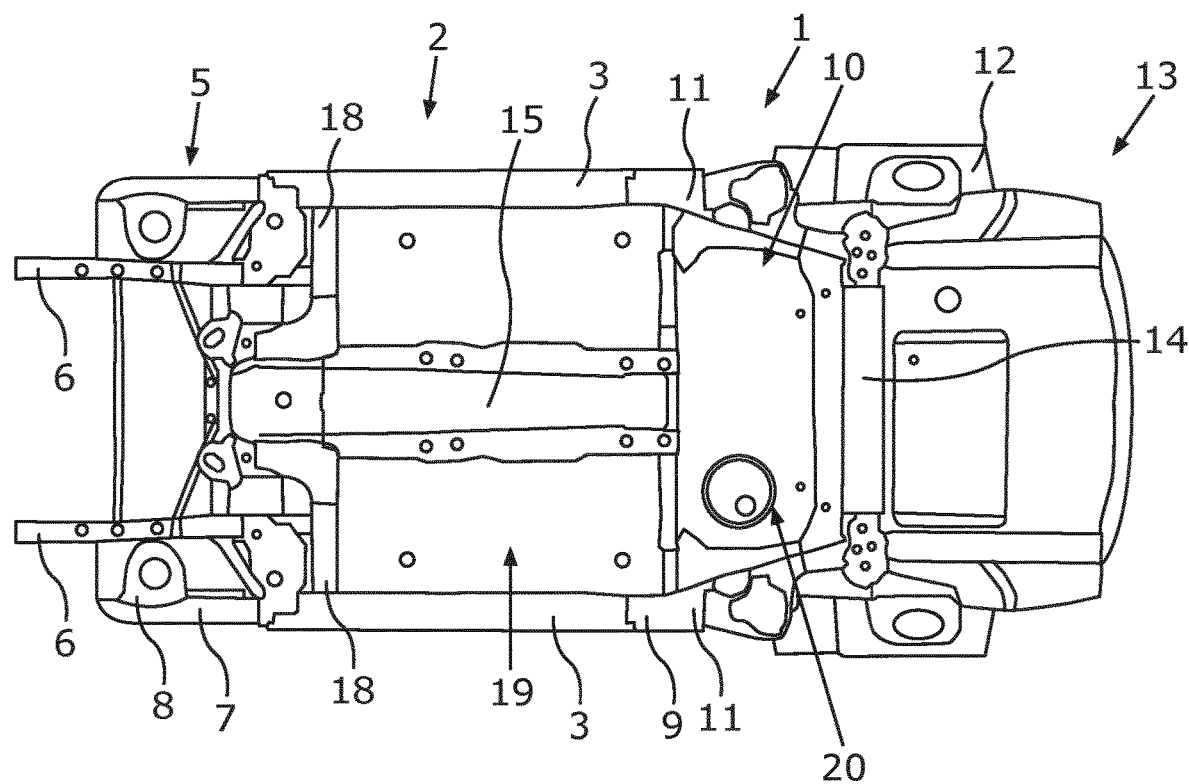

FIGS. 1a and 1b show a plan view and a view from below, respectively, of a floor assembly 1 for a passenger car which can be driven in a hybrid or electric manner (PHEV, BEV). In other words, one and the same floor assembly 1 according to FIGS. 1a and 1b is used on the shell side for the two design variants (BEV, PHEV) of the combined floor assembly and energy store, which floor assembly 1 is diversified with regard to the two different design variants of the combined floor assembly and energy store by way of mounting of different components.

Visible here is a main floor 2 which is bounded laterally by respective side sills 3 and extends forward as far as a front end wall 4. A front vehicle structure 5, which comprises respective engine longitudinal beams or main longitudinal beams 6, adjoins the main floor 2 at the front. Respective wheel arch frames 7, which are provided with respective suspension strut domes 8 at the top, are situated on the sides of the engine longitudinal beams 6.

The main floor 2 extends rearward as far as a heel wall 9 at which the main floor 2 merges into a rear end floor 10. Viewed in the longitudinal direction of the vehicle, rear longitudinal beams 11, which extend, inside respective wheel arch frames 12, in the region of a rear part 13 of the car as far as the vehicle tail, adjoin the rear ends of the respective side sills 3 in the region of the heel wall 9. A cross beam 14, which interconnects the rear longitudinal beams 11, moreover extends in the transverse direction of the vehicle, at the level of the rear wheel arch frames 12.

Also visible is a central tunnel 15 which extends from the heel plate 9 forward as far as the front end wall 4. Respective seat cross beams 16, which run in the transverse direction of the vehicle outward as far as the corresponding side sills 3, also adjoin the central tunnel 15.

It will now be explained with the aid of FIGS. 2a and 2b how the floor assembly 1 according to FIGS. 1a and 1b, which is applicable across all design variants, is equipped with corresponding components in order to form a design variant of a combined floor assembly and energy store for a passenger car with an exclusively electric drive (BEV). Here, a continuous energy store 17, which extends in the transverse direction of the vehicle outward as far as the respective side sills 3, is used on the underside of both the main floor 2 and the rear end floor 10. The energy store 17 extends forward as far as respective front cross beams 18 which can be seen in FIG. 1b and bound at the front a holder recess 19 of the main floor 2 for the energy store 17. The holder recess 19 is bounded on the outside by the side sills 3 and at the rear by the heel plate 9. The energy store 17 extends rearward beyond the heel plate 9 into the region of a holder recess 20 below the rear end floor 10, wherein the holder recess 20 is bounded at the front and back by the heel plate 9 or the cross beam 14 and on the outside by the longitudinal beams 11.

Figure 2A:
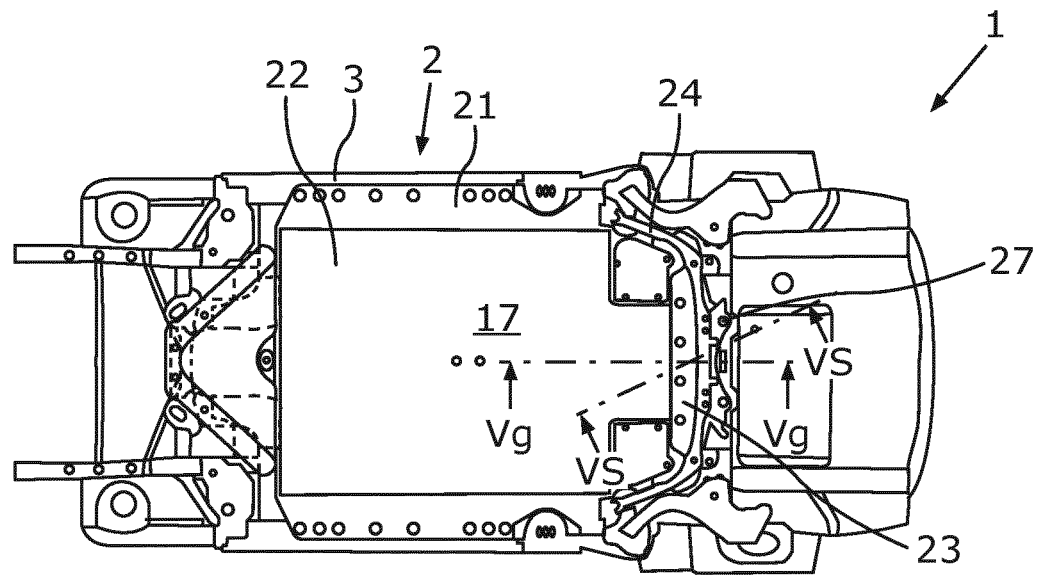
FIGS. 2a, b show a view from below and details of a perspective view from below of the combined floor assembly and energy store of the design variant for a passenger car with an exclusively electric drive (BEV) with an energy store which extends both below a main floor and below a rear floor rearward as far as a holding element in the form of a cross member which is connected to the rear axle mount.

In addition, it can be seen from FIG. 2a that the energy store 17 is screwed on the outer side by means of respective profiles 21 to the side sills 3. Front-side fastening of the energy store 17 by means of a profile 22 to the cross beams 18 via respective screw elements is provided in addition.

The rearward fastening of the energy store 17 of the design variant of the combined floor assembly and energy store for a passenger car with an exclusively electric drive (BEV) takes place in the middle region (as becomes clear from FIGS. 2a and 2b) by means of a holding element in the form of a cross member 23 which is fastened with its respective front outer ends 24 in a way which will still be described in the further text in the transition region between the rear ends of the side sills 3 and the respectively associated longitudinal beams 11. In addition, the cross member 23 is connected firstly by means of respective screw connections 25 to a rear end region 28 of the energy store 17 and secondly via respective screw connections 26 to a rear axle mount 27. In the present case, a central link concept is provided at the rear axle, in the case of which central link concept a respective lateral longitudinal link (not visible) is connected on the rear axle mount 27 in an articulated manner to in each case two transverse links (likewise not shown). Here, the rear axle in each case has separate spring struts and dampers.

Figure 3:
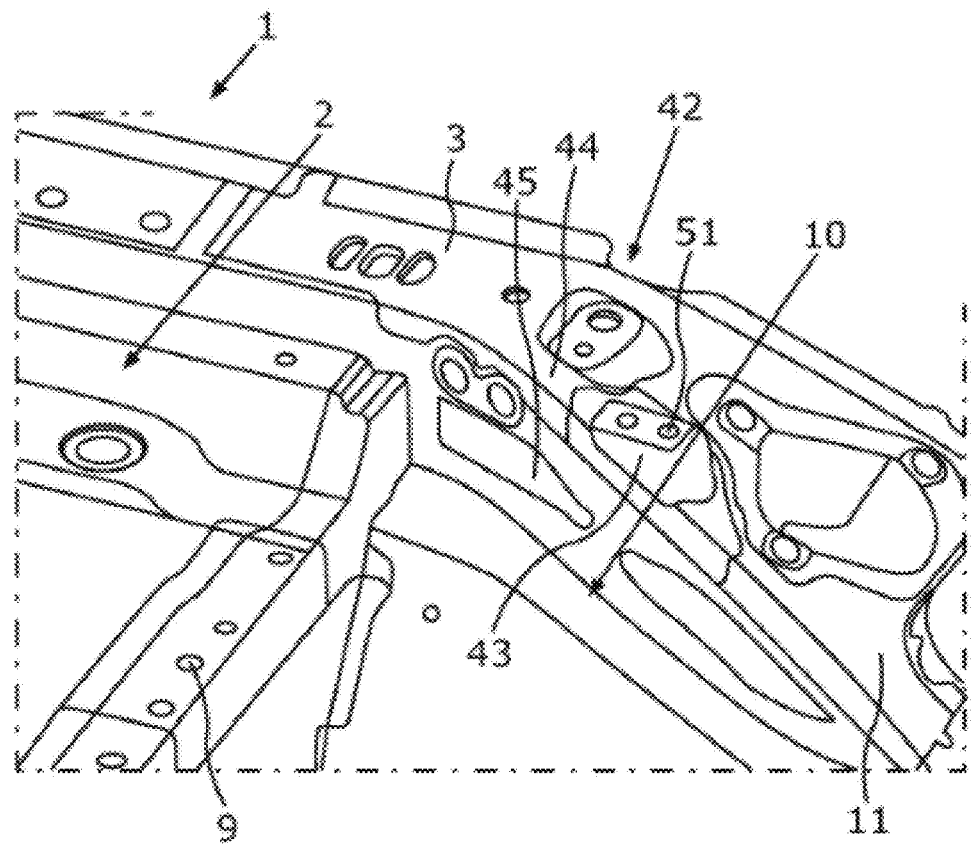
FIG. 3 shows details of a perspective view of the shell-side floor assembly, a holder which is arranged on the corresponding vehicle side being arranged at the rear end of the laterally assigned side sill or at the transition region of this side sill to a rear or inner longitudinal beam adjoining behind it.

FIG. 3 shows details of a perspective view of the underside of the floor assembly 1 on the left-hand side of the vehicle, viewed in the forward driving direction. Visible here is a rear end 42 of the corresponding side sill 3, in the region of which the side sill 3 merges into the laterally associated rear longitudinal beam 11. Also visible is the heel wall 9 which divides the main floor 2 from the rear end floor 10. As can now be seen in particular from FIG. 3, a side holder 43 is arranged at the front end of the rear longitudinal beam 11 and in the transition region between the rear end 42 of the side sill 3 and the front end of the rear longitudinal beam 11. It is situated at the level of the rear end floor 10, viewed in the longitudinal direction of the vehicle. In the present case, the holder 43 here takes the form of a shaped sheet-metal part and is joined to an underside 44 or inner side 45 of the longitudinal beam 11, across the corner. Other embodiments would of course also be conceivable here. A symmetrically identical or identically arranged holder 43 is also situated on the opposite right-hand side of the vehicle.

The respective holder 43 serves, in the design variant of the combined floor assembly and energy store for an exclusively electric drive (BEV), to fasten the energy store and, via the energy store 17, also to fasten the cross member 23 to the floor assembly 1. This can be seen in particular in FIG. 4a, in which, in details of a perspective view from below, the fastening of the energy store 17 extending as far as the rear end floor 10 in the longitudinal direction of the vehicle according to the first design variant of the combined floor assembly and energy store is illustrated.

Figure 4A:
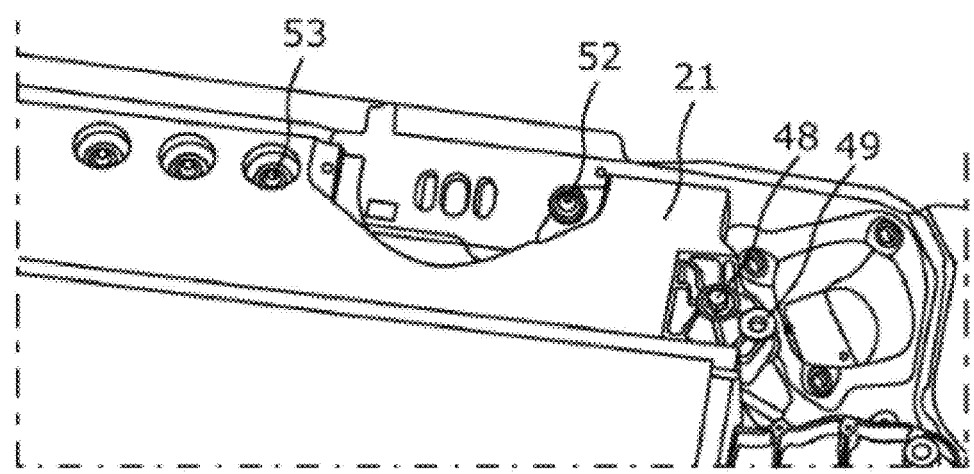
FIGS. 4a-c show details of a perspective view of the underside arrangement of the energy store for the combined floor assembly and energy store in accordance with the first design variant in the region of the associated holder, details of a view from below of the combined floor assembly and energy store in accordance with the first design variant, in the case of which the cross member is arranged at the rear end of the energy store, and a perspective view from below of the cross member in the region of the respective, laterally assigned holder.
Figure 4B:
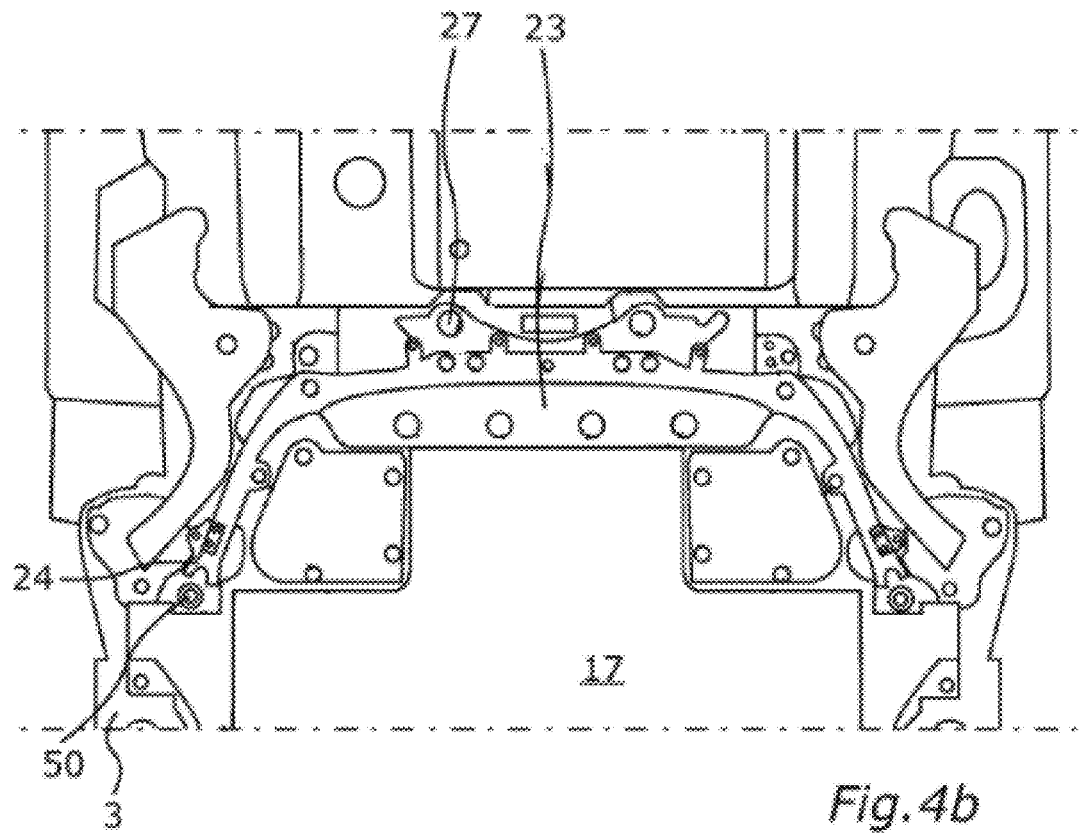
Figure 4C:
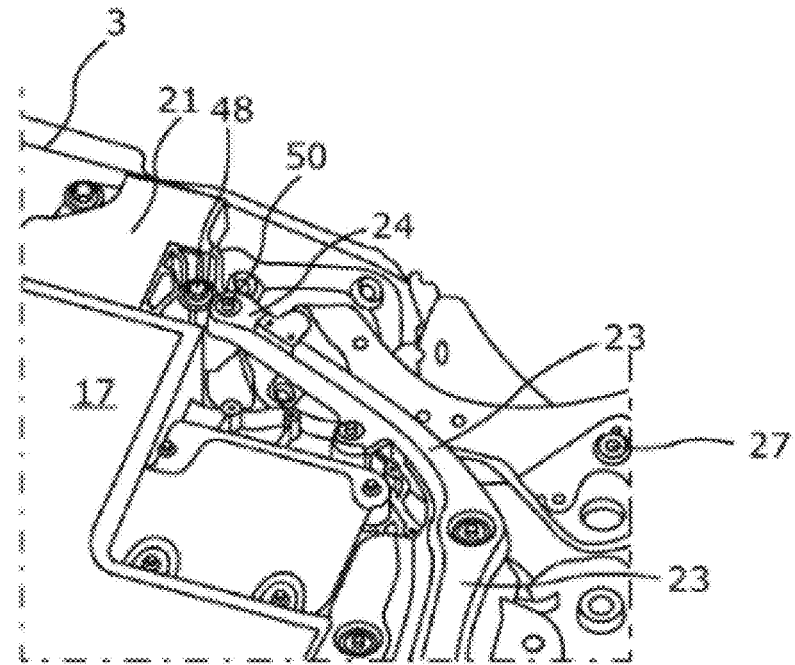

It can be seen here in combination with FIG. 4c that the energy store 17 is fastened to the holder 43 in the region of the outer profile 21 by means of a screw 48 screwed into a threaded hole/fastening point 51 of the holder 43.

Also visible in the region of the profile 21 of the energy store 17 is a threaded sleeve 49, on which the cross member 23 can be fixed by means of a screw 50 or a fastening element of the like which can be seen further, in particular, in FIGS. 4b and 4c. Accordingly, the cross member is fixed with its respective front end 24 on the energy store 17 and, via the latter, on the laterally respectively associated holder 43. In the present case, the fastening point 51 of the energy store 17 is positioned on the holder 43 in front of the fastening point/sleeve 49 for the cross member 23 on the energy store 17 by a small spacing in the vehicle longitudinal direction. This becomes clear, for example, from FIG. 4c on the basis of the spacing of the screws 48 (screwed into the fastening point 51) and the screw 50 (screwed into the fastening point/sleeve 49 for the cross member 23 on the energy store 17). Direct fastening of the cross member 23 to the associated holder 43 would of course also be conceivable here. For example, it would also be conceivable for the fastening points 51 and 49 to be arranged in an overlap with one another and for both the energy store 17 and the cross member 23 to be fastened to the holder 43 via one and the same through hole or by means of one and the same fastening means, for example a screw. It is essential, however, that the fastening point 49 for the cross member 23 is arranged in the vehicle vertical direction at least substantially in an overlap with the associated holder 43, in order to achieve an optimum load path or an optimum transmission of force.

Also visible from FIG. 4a is a rearmost screw 52 and further screws 53 by means of which the profile 21 of the energy store 17 is fixed to the underside of the side sill 3 on the respective side of the vehicle. It can consequently be seen that a fastening point of the energy store 17 is created on the side sill 3 behind the last fastening option by means of the respective holder 43 in order to create as a result in particular a body fastening point situated further to the rear for the energy store 17 such that, in the case of separate store mounting, the rear end of the energy store 17 is already fastened on the shell side to chassis and drive components and the rear axle mount 27 before the marriage of the combined floor assembly and energy store. In addition, the respective holder 43 thus serves as the last body fastening point in the longitudinal direction of the vehicle for the energy store 17 so that loads can be diverted from the cross member 23 to the body or floor assembly 1. It is thus necessary to secure the energy store 17 by means of the screw 48 as a minimum screw connection so that the energy store 17 does not hang freely before the marriage and can withstand corresponding damage.

The fastening of the cross member 23 is illustrated here with the aid of FIGS. 4b and 4c in details of a view from below or details of a perspective view. It can in particular be seen here that the respective front ends 24 of the cross member 23 are fixed by means of the associated screw 50 to the corresponding holder 43 and hence to the shell side on the respective side of the vehicle.

Figure 2B:
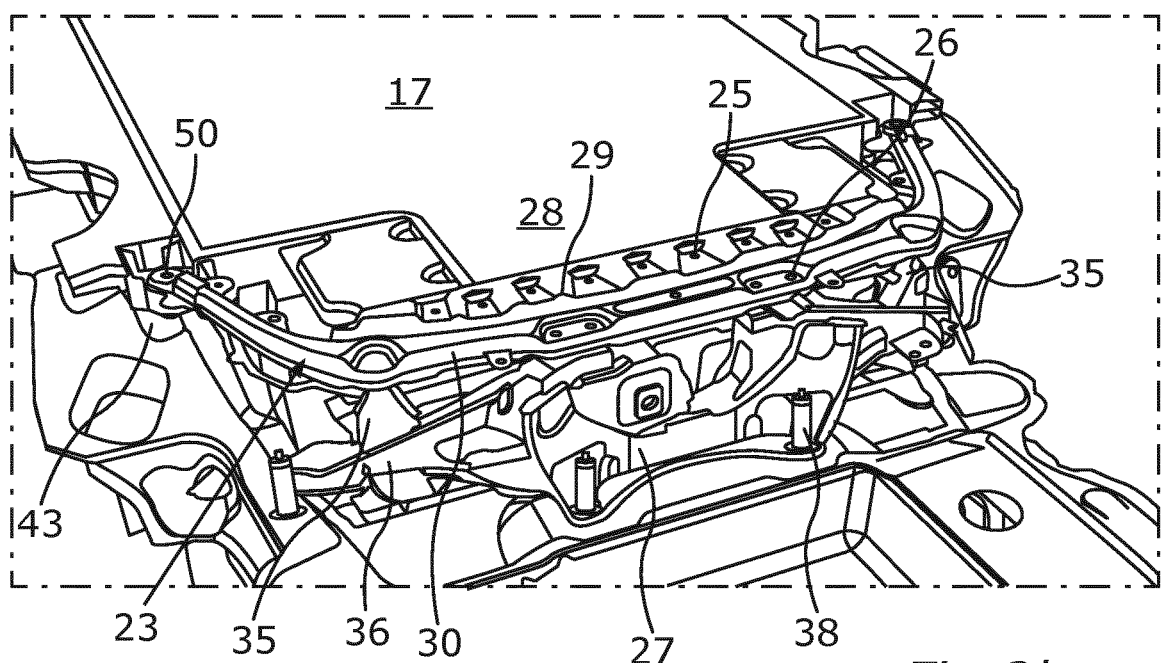

A total of six screw connections 26 can moreover be seen in particular in FIGS. 2b and 4b, by means of which the cross member 23 is connected to the rear end of the energy store 17. Six screw connections 25 can moreover be seen, by means of which the cross member 23 is connected to the rear axle mount 27. A particularly favorable join between the member 23 and the rear axle mount 27 or a particularly favorable support of these parts on the floor assembly 1 and favorable fastening of the energy store 17 are thus achieved as a whole. A further advantage is that both the cross member 23 and the energy store 17, and also the rear axle mount 27, can each be mounted and dismantled separately in order to avoid complex mounting processes, for example, when replacing worn components.

Figure 5A:
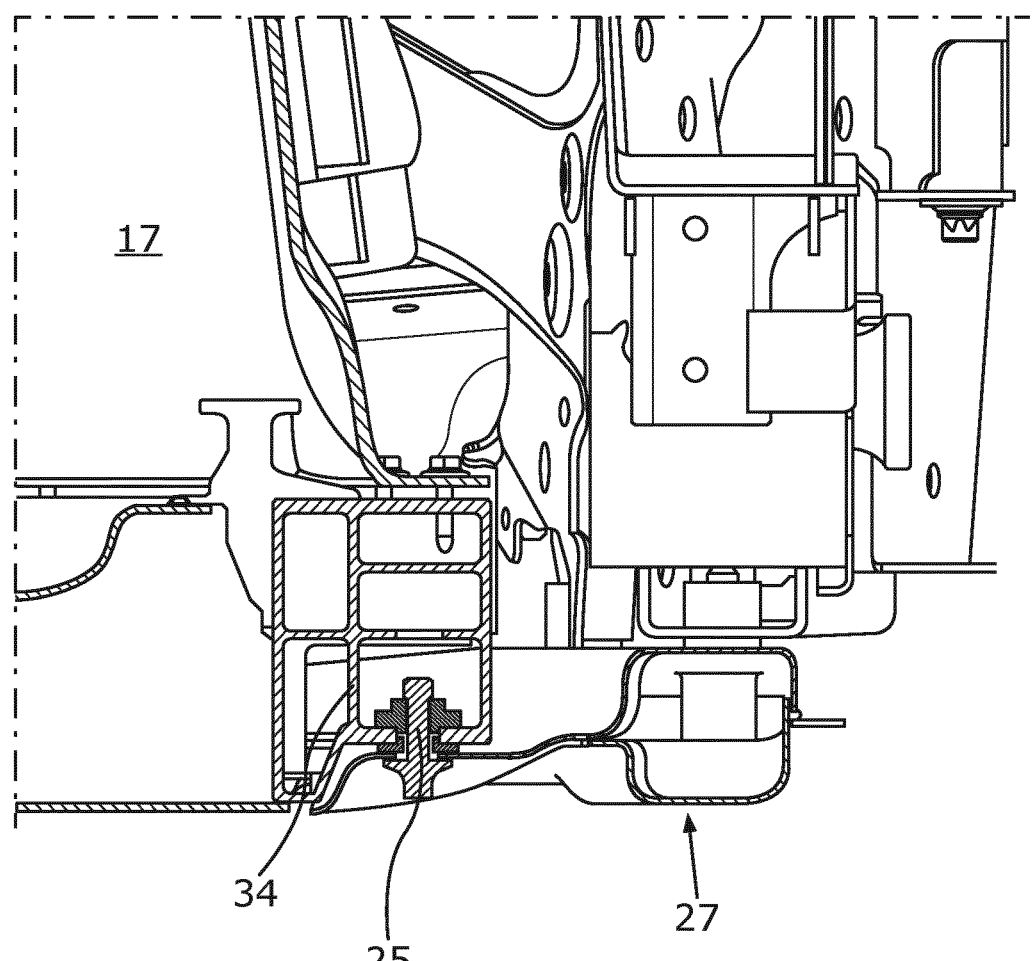
Figure 5B:
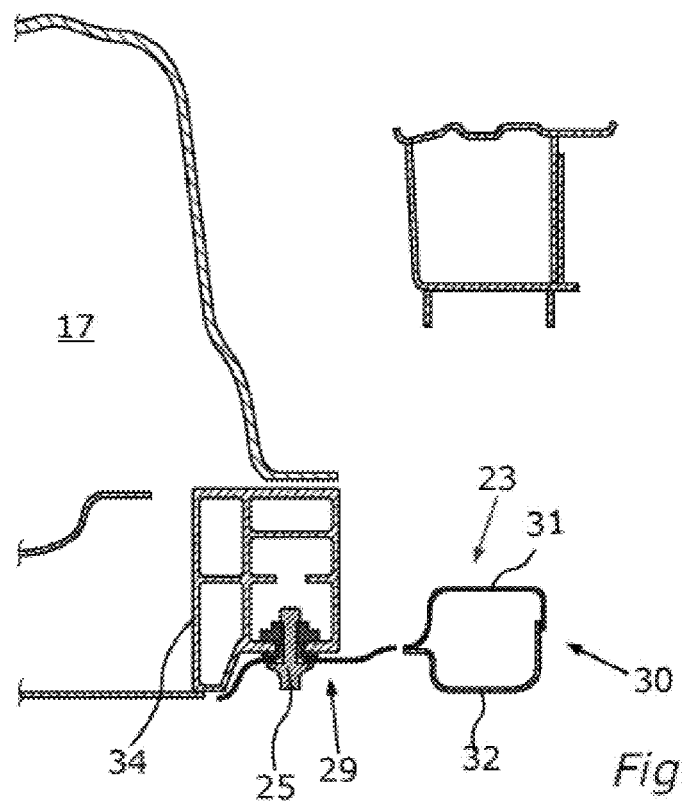
Figure 5C:
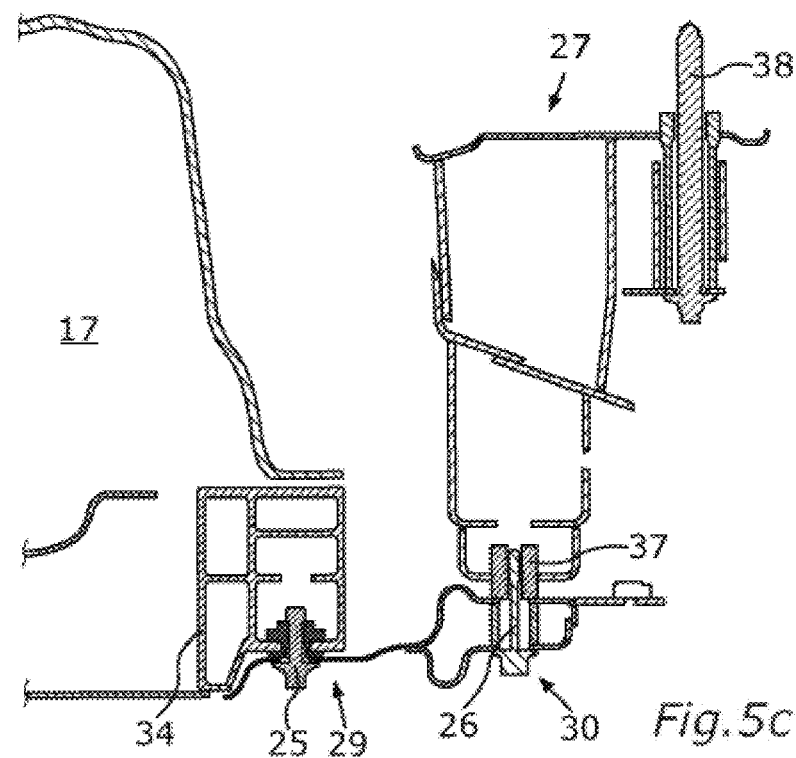

FIGS. 5a and 5b show details of a perspective sectional view and a lateral sectional view along a sectional plane which runs in the vehicle vertical direction and is indicated by the line Vs-Vs in FIG. 2a, and FIG. 5c shows a lateral sectional view along a sectional plane which runs in the vehicle vertical direction and is indicated by the line Vg-Vg in FIG. 2a. It can be seen, in particular from the right-hand illustration according to FIG. 5a, that the holding element or the cross member 23 has a shear area/support part 29 which is held on a carrier part 30 which is configured as a box-type profile. In the present case, the holding element 23 is assembled from two shell elements 31, 32 which are configured as sheet metal shells. Here, the shear area/support part 29 is configured as an integral part of the upper shell element 31 which is connected in the region of the carrier part 30 to a further, lower shell element 32 with the configuration of a hollow carrier structure.

The shear area/support part 29 is connected via the screw connections 25 to a rear profile 34 on the rear end region 28 of the energy store 17. For tolerance compensation, the shear area/support part 29 is of softer configuration in the vehicle vertical direction than the carrier part 30 of the holding element 23, to which the shear area/support part 29 is fastened. Respective sleeves 37 are inserted into the rear axle mount 27, to which sleeves 37 the carrier part 30 of the cross member 23 is screwed by means of the screws 26. The rear axle mount 27 is connected via screws 38 on the vehicle body side to the floor assembly 1.

Moreover, it can be seen from FIG. 2b that respective support elements 35 for fastening the holding element 23 are arranged on the rear axle mount 27. Therefore, by way of the support elements 35, the cross member 23 which runs at least substantially at a constant height can be connected in a stable manner to a respective carrier region 36, rising upward toward the outer side, of the rear axle mount 27.

Figure 6A:
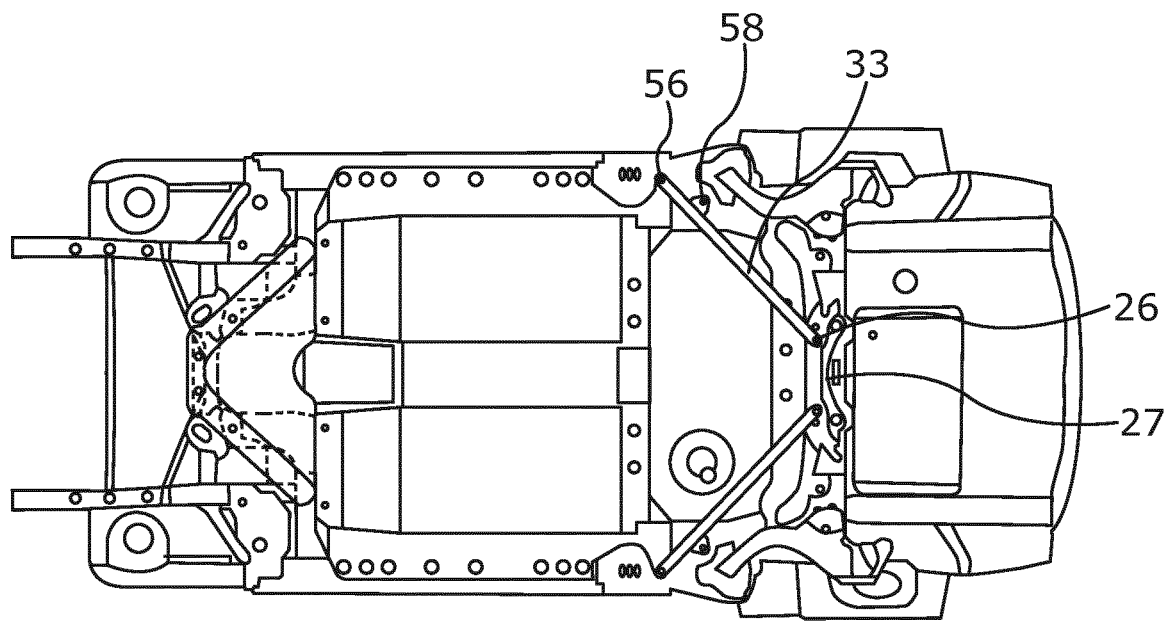
FIGS. 6a-c show a view from below, details of a perspective view, and details of a perspective view from below of the floor assembly in accordance with a further design variant for a passenger car with an internal combustion engine drive (ICE), in the case of which the rear axle mount is connected via respective struts to the respective laterally assigned side sill of the floor assembly.
Figure 6B:
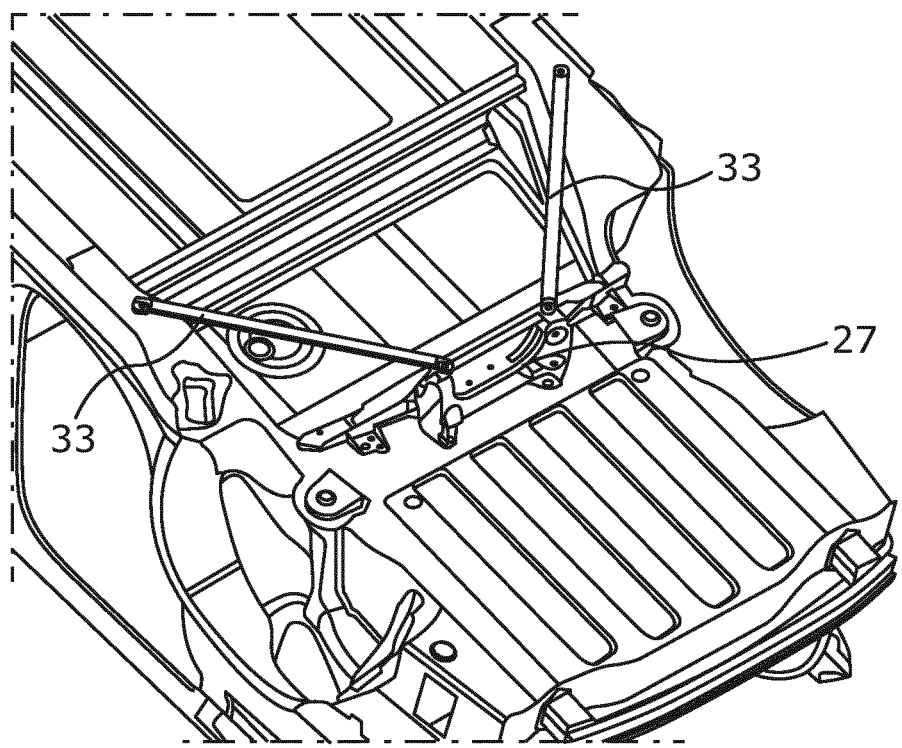
Figure 6C:
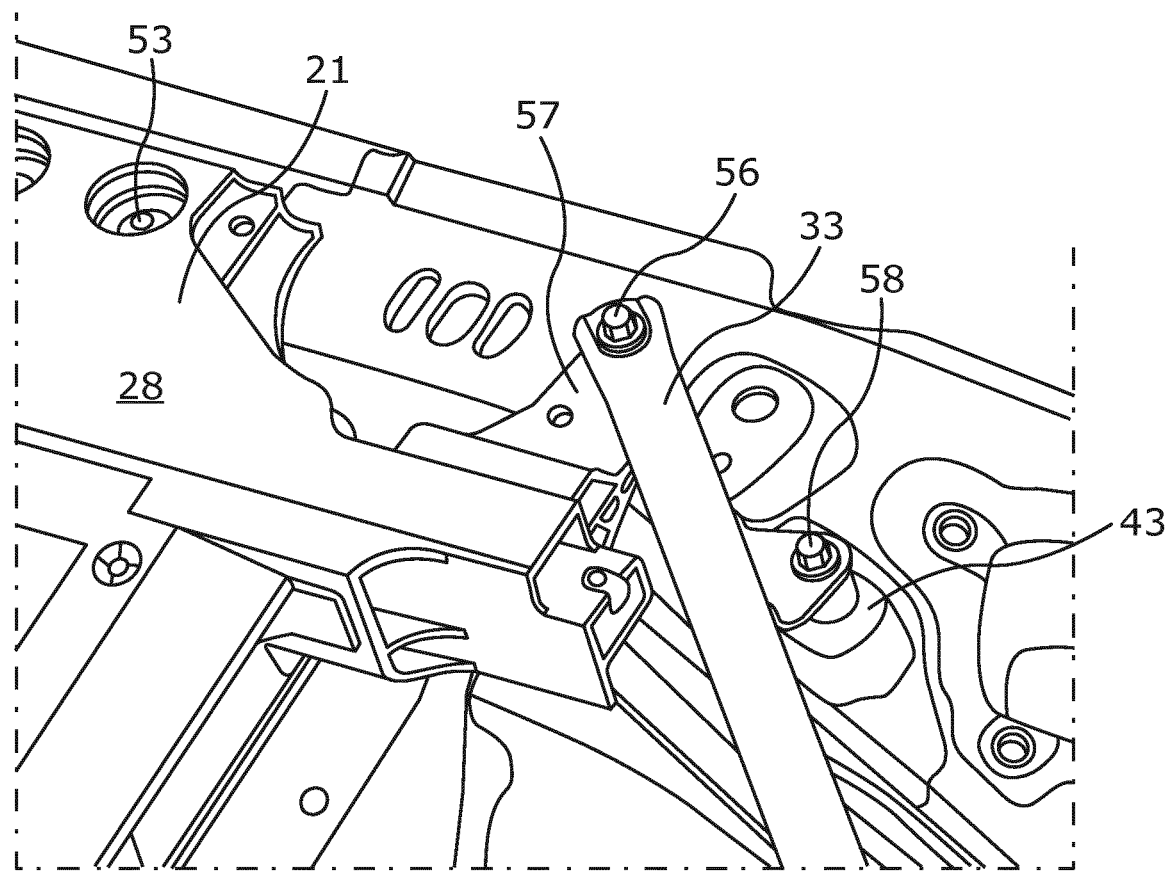

FIGS. 6a-c show a view from below, details of a perspective view, and details of a perspective view from below of the floor assembly 1 in accordance with a further design variant for a passenger car with an internal combustion engine drive (ICE), in the case of which the rear axle mount 27 is connected via respective struts 33 to the respectively laterally assigned side sill 3 of the floor assembly 1. FIG. 6c illustrates, in particular, that the strut 33 is fastened at its respective outer front end via a screw connection 56 to the rear end of the corresponding side sill 3. Here, the fastening of the strut 23 takes place via or with the interposition of a holder 57 of the profile 21 of the energy store 17. Moreover, the strut 33 is fixed by means of a screw connection 58 to the corresponding threaded hole 50 of the holder 43. This results in an optimized connection 33 to the side sill 3 and the rear longitudinal beam 11 via the holder 43 and to the heel plate 9 via the holder 43, in order to achieve optimum support of the rear axle mount 27 in this way. The fastening points 51 for the energy store 17 on the holders 43 and the fastening points/screws 26 for the holding element 23 on the rear axle mount 27 in the case of the design variant of the combined floor assembly and energy store for a passenger car with an exclusively electric drive (BEV) are therefore at least substantially identical to the fastening points 51, 26 in the case of the design variant of the floor assembly 1 for a passenger car with an internal combustion engine drive (ICE) for fastening respective struts 33 to the holders 43 or to the rear axle mount 27.

Figure 7A:
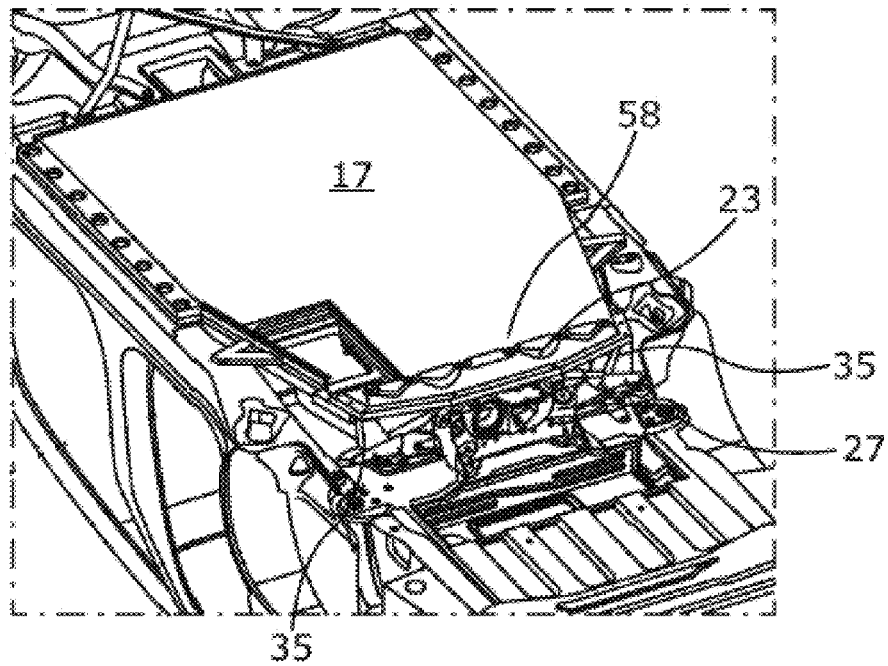
FIGS. 7a, b show details of a perspective view from below and a perspective view, enlarged in comparison with the former, of a holding element/cross member at the rear end of the energy store in accordance with a further embodiment.
Figure 7B:
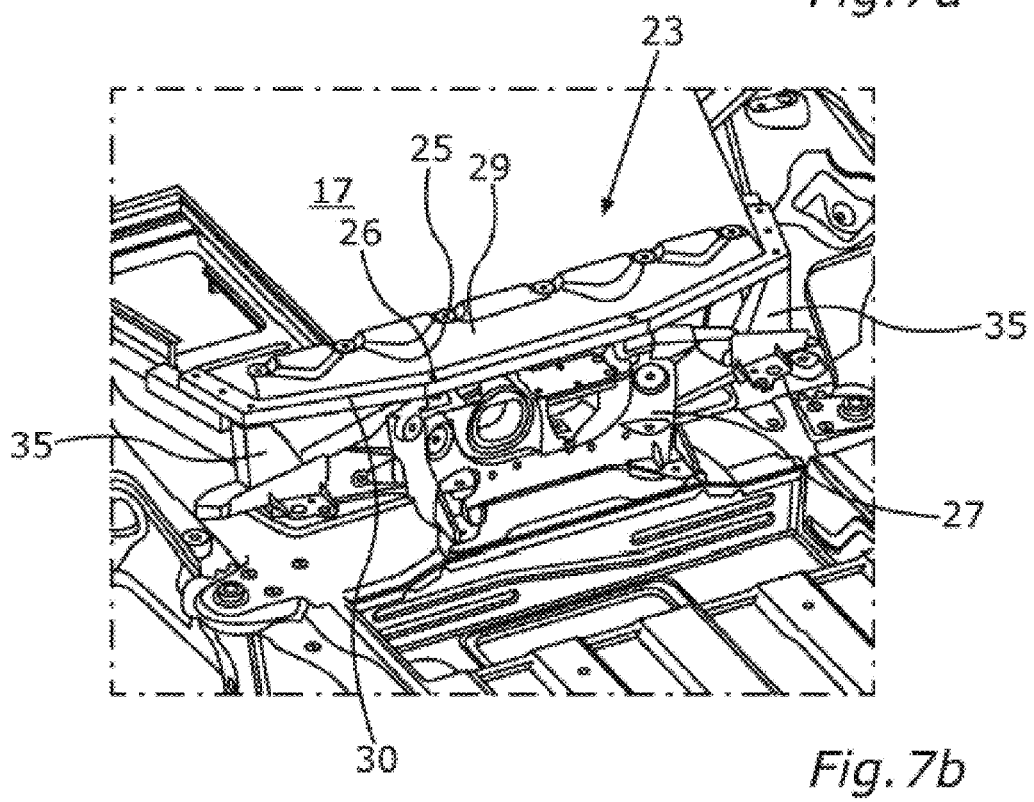

Finally, FIGS. 7a and 7b show details of a perspective view from below and a perspective view, enlarged in comparison with the former, of the holding element/cross member 23 at the rear end of the energy store 17 in a further embodiment. Here, in particular, the carrier part 30 which is assembled here from hollow profiles can be seen, on which carrier part 30 the shear area 29 is arranged. Here, in the present case, the holding element/cross member 23 is fastened only to the rear axle mount 27. Fastening of the holding element/cross member 23 to the floor assembly 1 is likewise possible, however.

In addition, there is a support designed in a different way of the energy store 17 for the respective rearmost screw 52, by means of which the profile 21 of the energy store 17 is fixed on the underside of the side sill 3 on the respective vehicle side.

Overall, it therefore becomes clear from the description of the figures that the rear axle mount 27 in the case of the design variant of the floor assembly for a vehicle with an internal combustion engine drive (ICE) is supported or fastened on the vehicle body side via respective lateral torsion struts 33. Since the torsion struts 33 cannot be used for space reasons in the case of the design variant of the combined floor assembly and energy store for a passenger car with an exclusively electric drive (BEV), the cross member 23 is provided there. Here, the cross member 23 serves additionally as a guard of the energy store, for example, in the case of driving into a curb, driving into a bollard or driving over a bollard.

LIST OF DESIGNATIONS 1 floor assembly
2 main floor
3 side sill
4 end wall
5 front car structure
6 main longitudinal beam
7 wheel arch frame
8 suspension strut dome
9 heel plate
10 rear end floor
11 longitudinal beam
12 wheel arch frames
13 rear part of the car
14 cross beam
15 central tunnel
16 seat cross beam
17 energy store
18 longitudinal beam 19 holder recess
20 holder recess
21 profile
22 profile
23 cross member
24 end
25 screw connection
26 screw connection
27 rear axle mount
28 end region
29 shear area/support part
30 carrier part
31 shell element
32 shell element
33 strut
34 profile
35 support element
36 carrier region
37 sleeves
42 end
43 holder
44 underside
45 inner side
48 screw
49 sleeve or fastening point
50 screw
51 fastening point
52 screw
53 support

The invention claimed is:

1. A combined floor assembly and energy store for an electrically drivable passenger car, comprising:
 a floor assembly;
 an energy store of an electric drive of the passenger car arranged on an underside of the floor assembly;
 a holding element assembled from a plurality of shell elements, by which a rear end region of the energy store is held on the underside of the floor assembly; and
 a rear axle mount arranged on the underside of the floor assembly and behind the energy store in a vehicle longitudinal direction, wherein
 the rear end region of the energy store is fastened to the rear axle mount via the holding element
 the holding element is fastened by way of respective lateral ends to fastening points of the energy store,
 the energy store is fastened in the region of the fastening points to respective lateral holders on the floor assembly,
 the holding element is configured as a substantially U-shaped cross member which engages around the rear end region of the energy store,
 the holding element or the U-shaped cross member has a shear area/support part which is of softer configuration for tolerance compensation in a vehicle vertical direction than a carrier part of the holding element, to which the shear area/support part is fastened, and
 the shear area/support part is configured as an integral part of one of the plurality of shell elements which is connected in the region of the carrier part to a further one of the plurality of shell elements with the configuration of a hollow carrier structure.

2. The combined floor assembly and energy store according to claim 1, wherein
 the rear axle mount is connected fixedly to the floor assembly.

3. The combined floor assembly and energy store according to claim 1, wherein
 respective support elements for fastening the holding element are arranged on the rear axle mount.

\* \* \* \* \*